DUVAL, CALLIGAN & MILLER.
Grain Cleaner.
No. 996.
2 Sheets—Sheet 1.
Patented Nov. 3, 1838.
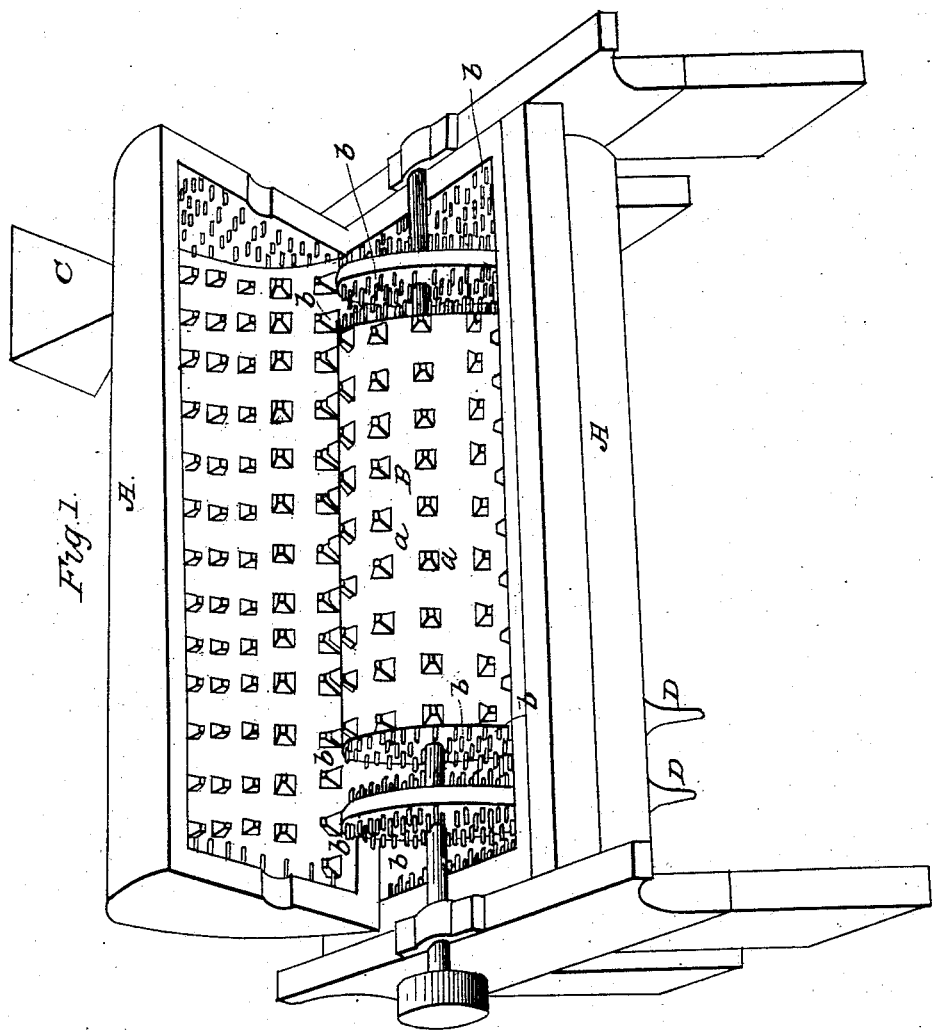

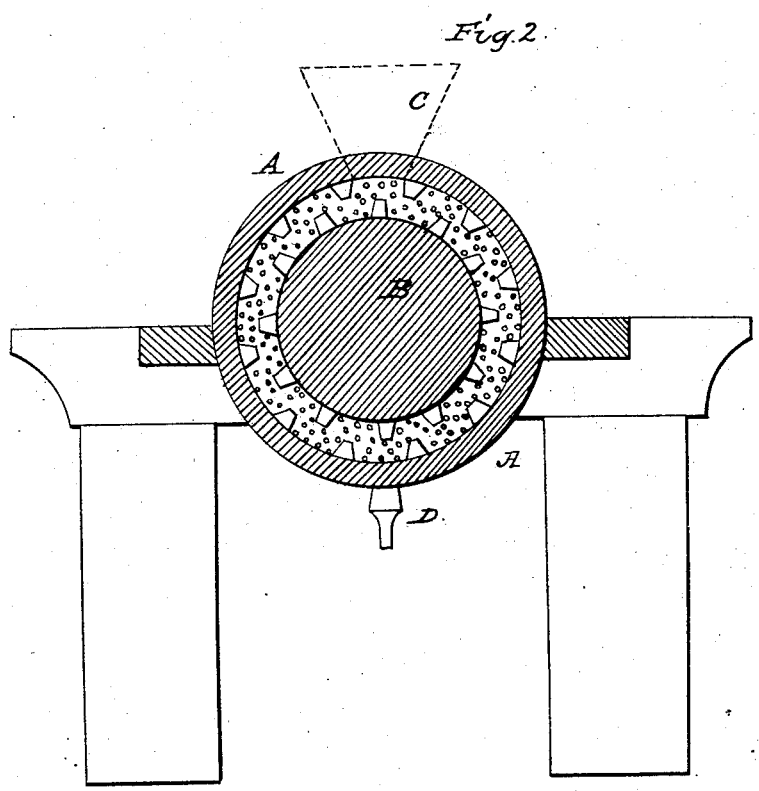

UNITED STATES PATENT OFFICE.

ZELAPHIA DUVAL, ALEXANDER CALLIGAN, AND JOS. W. MILLER, OF ELLICOTT MILLS, MARYLAND.

MACHINE FOR RUBBING AND SEPARATING GARLIC AND OTHER SUBSTANCES FROM WHEAT.

Specification of Letters Patent No. 996, dated November 3, 1838.

*To all whom it may concern:*

Be it known that we, ZELAPHIA DUVAL, ALEXANDER CALLIGAN, and JOSEPH W. MILLER, of Ellicotts Mills, in the county of Baltimore and State of Maryland, have invented an Improved Rubber for Wheat, by the operation of which garlic and other substances more easily crushed than wheat are broken up, so as to be readily separated in the process of cleaning; and we do hereby declare that the following is a full and exact description thereof.

Figure 1, in the accompanying drawing shows a perspective view of the machine, and Fig. 2, a cross-section thereof.

A, A, is a cylindrical case, consisting of two semi-cylinders which may be hinged and clamped or otherwise secured together, when in use. Within this hollow cylinder, we place a solid one B, B, which is to revolve within it, leaving a space of half an inch, more or less, between the two. Studs of iron, $a, a, a,$ are to be driven into the interior of the outer, and around the exterior of the inner, cylinder, projecting out so as to escape each other, as the inner cylinder revolves, while they subject the grain contained between them to a rubbing sufficiently forcible to produce the desired effect.

Into the ends of the cylinder we drive spikes, pins, or strong wires, $b, b, b,$ sufficiently close together to aid in effecting the intended purpose. On one end of the outer cylinder we place a hopper, or feed trough C, through which the grain is to be introduced. As it is intended to subject the grain to a more severe rubbing than has been usually effected, this trough, or hopper, may be of such height as will cause a greater degree of pressure than would be produced by one of no greater elevation than was intended for mere feeding. We make another provision, however, which independently of the elevation of the feeding hopper, will afford any desired degree of pressure upon the grain, namely, instead of making a single opening on the lower side of the machine, at the end opposite to that at which the feeding is effected, we make two, three, or more, of small size, any number of which we close by means of pegs, or stoppers D, D; or we make a large opening, attaching thereto a shutter, a valve, or other similar device, by which its size may be regulated and the quantity escaping therefrom determined.

To lead the grain from the feeding to the escape end of the machine, the studs on the revolving cylinder are placed spirally, and the degree of obliquity in the spiral, combined with the diminution in the size of the delivering orifice, may be made to influence the degree of pressure given to the grain. We have represented our machine as placed horizontally, but this position may be changed, and the principle of action retained.

What we claim as our invention, and desire to secure by Letters Patent, is—

The manner of increasing the pressure upon the grain by regulating the feeding, and the escape of the same, upon the principle, or in the manner, above set forth.

ZELAPHIA DUVAL.
ALEXANDER CALLIGAN.
JOS. W. MILLER.

Witnesses:
SAML. E. TYSON,
WM. DURHAM.